(12) United States Patent
Doublet

(10) Patent No.: US 8,558,995 B2
(45) Date of Patent: Oct. 15, 2013

(54) STRUCTURE COMPRISING A FIBROUS MATERIAL SUBSTRATE AND METHOD FOR AUTHENTICATING AND/OR IDENTIFYING SUCH A STRUCTURE

(75) Inventor: Pierre Doublet, Saint Brice (FR)

(73) Assignee: Arjowiggins Security, Issy les Moulineaux (FR)

( * ) Notice: Subject to any disclaimer, the term of this patent is extended or adjusted under 35 U.S.C. 154(b) by 1094 days.

(21) Appl. No.: 11/991,649

(22) PCT Filed: Sep. 15, 2006

(86) PCT No.: PCT/FR2006/050896
§ 371 (c)(1),
(2), (4) Date: Sep. 9, 2008

(87) PCT Pub. No.: WO2007/031694
PCT Pub. Date: Mar. 22, 2007

(65) Prior Publication Data
US 2009/0033914 A1 Feb. 5, 2009

(30) Foreign Application Priority Data
Sep. 15, 2005 (FR) ...................................... 05 52778

(51) Int. Cl.
*G06K 9/74* (2006.01)
(52) U.S. Cl.
USPC .......................................................... 356/71
(58) Field of Classification Search
USPC .............. 356/71; 235/494; 162/110, 111, 112
See application file for complete search history.

(56) References Cited

U.S. PATENT DOCUMENTS

| | | | | |
|---|---|---|---|---|
| 3,077,398 | A * | 2/1963 | Jones | 430/134 |
| 3,573,158 | A * | 3/1971 | Pall et al. | 62/131 |
| 4,265,703 | A | 5/1981 | Terliska | |
| 4,591,707 | A * | 5/1986 | Stenzel et al. | 283/83 |
| 4,882,220 | A * | 11/1989 | Ono et al. | 442/96 |
| 5,102,501 | A * | 4/1992 | Eber et al. | 162/129 |
| 5,122,229 | A * | 6/1992 | Seifert | 162/60 |
| 5,228,112 | A * | 7/1993 | Lemelson | 704/275 |
| 5,240,621 | A * | 8/1993 | Elonen et al. | 210/787 |
| 5,364,557 | A * | 11/1994 | Faris | 252/299.01 |
| 5,599,412 | A * | 2/1997 | Faris | 156/73.3 |
| 5,792,317 | A * | 8/1998 | Taylor et al. | 162/175 |
| 5,837,103 | A * | 11/1998 | Trokhan et al. | 162/358.2 |
| 5,919,556 | A * | 7/1999 | Barnholtz | 428/218 |
| 6,004,666 | A * | 12/1999 | Hornig et al. | 428/321.5 |
| 6,105,223 | A * | 8/2000 | Brown et al. | 28/111 |
| 6,643,001 | B1 * | 11/2003 | Faris | 356/37 |
| 6,861,388 | B2 * | 3/2005 | Ishibashi et al. | 503/200 |
| 7,353,994 | B2 * | 4/2008 | Farrall et al. | 235/454 |

(Continued)

FOREIGN PATENT DOCUMENTS

| | | | |
|---|---|---|---|
| FR | 2 425 937 A1 | 12/1979 | |
| FR | 2 804 784 A1 | 8/2001 | |

(Continued)

*Primary Examiner* — Roy M Punnoose
(74) *Attorney, Agent, or Firm* — Oliff & Berridge, PLC

(57) ABSTRACT

The invention concerns a structure (1) comprising: a least one fibrous material substrate (2), optionally at least one surface layer deposited on one surface of the substrate, a plurality of heterogeneous elements (3) of the substrate and/or of the optional surface layer, dispersed randomly within the substrate and/or the optional surface layer, at least one authenticating and/or identifying information having a relationship with at least one spatial and/or physical feature of part at least of said heterogeneous elements.

40 Claims, 3 Drawing Sheets

(56) References Cited

U.S. PATENT DOCUMENTS

| | | | |
|---|---|---|---|
| 7,645,510 B2 * | 1/2010 | Argoitia | 428/402 |
| 2003/0014647 A1 | 1/2003 | Bourrieres et al. | |
| 2004/0112962 A1 * | 6/2004 | Farrall et al. | 235/462.01 |
| 2004/0118530 A1 * | 6/2004 | Kressner et al. | 162/109 |
| 2004/0234804 A1 * | 11/2004 | Liu et al. | 428/537.5 |
| 2005/0110978 A1 * | 5/2005 | Potyrailo et al. | 356/71 |
| 2005/0173084 A1 * | 8/2005 | Doublet | 162/109 |
| 2006/0011316 A1 * | 1/2006 | Kressner et al. | 162/134 |
| 2007/0020445 A1 * | 1/2007 | Liu et al. | 428/195.1 |
| 2007/0058227 A1 * | 3/2007 | Raksha et al. | 359/2 |
| 2007/0178260 A1 * | 8/2007 | Levy et al. | 428/34.2 |
| 2008/0041542 A1 * | 2/2008 | Gray et al. | 162/102 |
| 2008/0097618 A1 * | 4/2008 | Baker et al. | 623/23.51 |

FOREIGN PATENT DOCUMENTS

| | | | |
|---|---|---|---|
| GB | 2 304 077 A | | 3/1997 |
| GB | 2304077 A | * | 3/1997 |
| GB | 2 324 065 A | | 10/1998 |
| GB | 2324065 A | * | 10/1998 |
| WO | WO 02/20902 A1 | | 4/2000 |
| WO | WO 2004/012228 A2 | | 2/2004 |

* cited by examiner

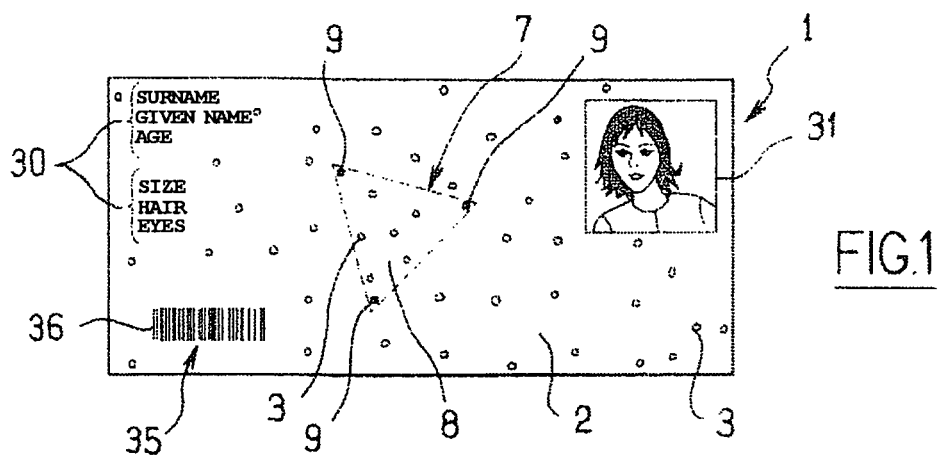
FIG.1
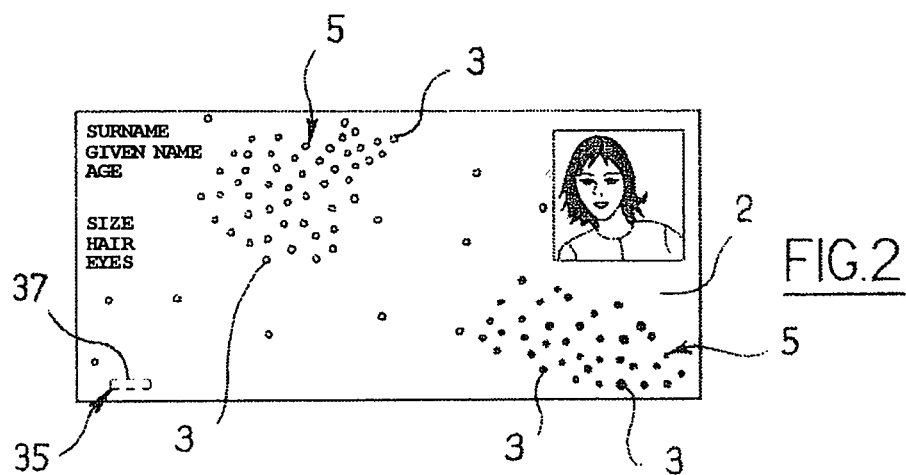
FIG.2
FIG.3
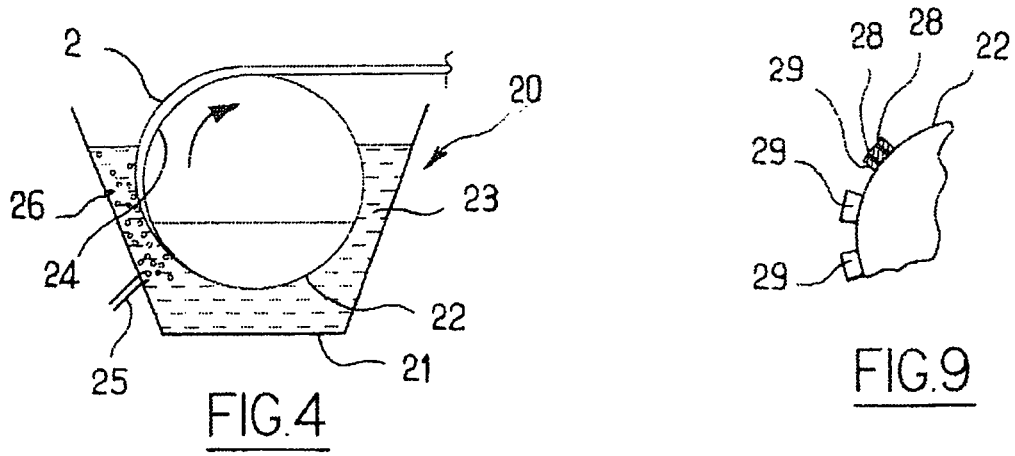
FIG.4
FIG.9

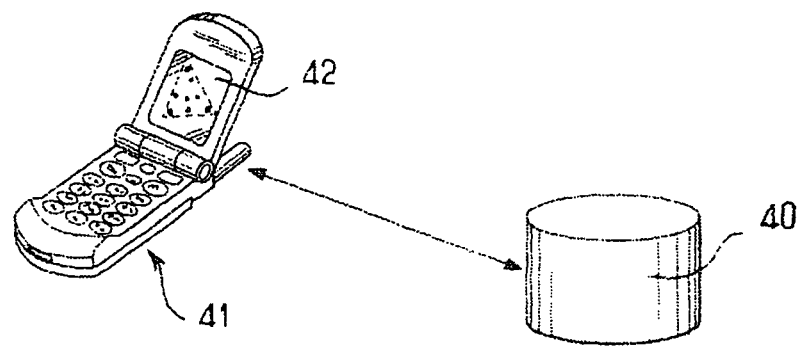
FIG.10
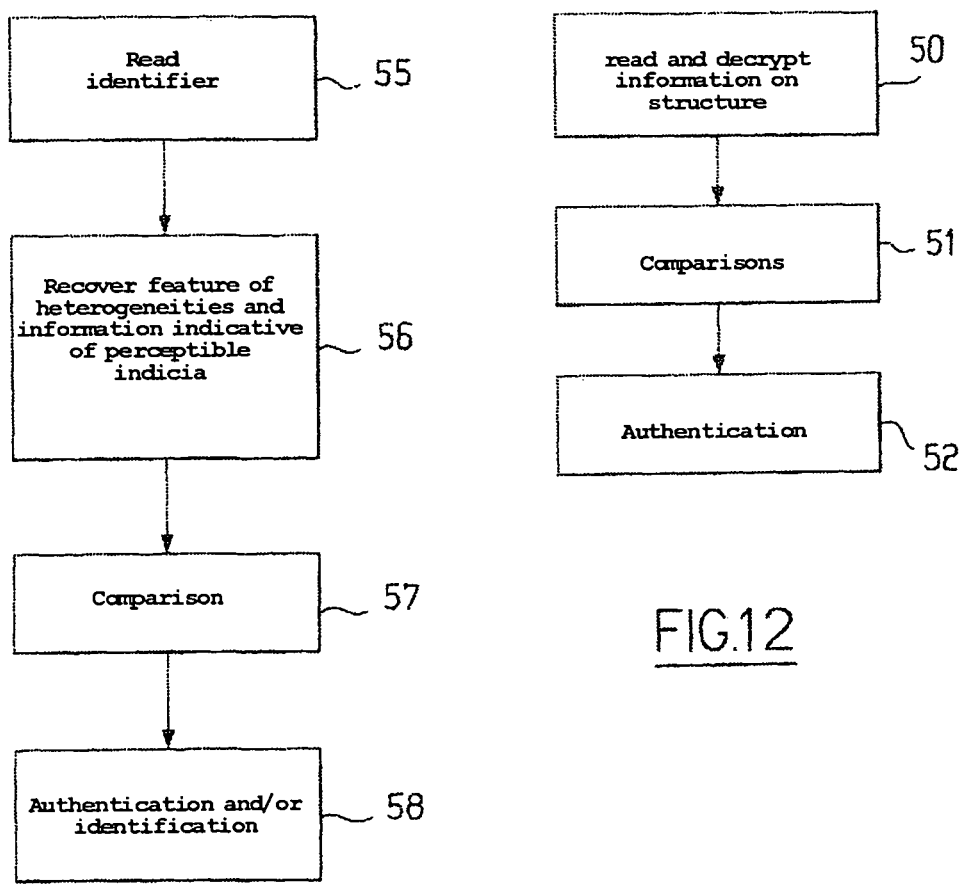
FIG.11
FIG.12

STRUCTURE COMPRISING A FIBROUS MATERIAL SUBSTRATE AND METHOD FOR AUTHENTICATING AND/OR IDENTIFYING SUCH A STRUCTURE

FIELD OF THE DISCLOSURE

This invention relates in particular to a structure comprising a fibrous material substrate and a method for authenticating and/or identifying such a structure.

BACKGROUND

From patent application FR 2 804 784, an identifying member made of a transparent curable resin is known, which incorporates gas bubbles randomly scattered within the identifying member. The gas may optionally be colored in order to increase the contrast between the bubbles and the remainder of the identifying member. This identifying member requires a specific manufacturing process, which is appropriate only for certain types of material.

Also known from patent application FR 2 425 937 is a fibrous structure containing metal fibers. In order to authenticate or identify the fibrous structure, a signature formed by metal fibers dispersed within the fibrous structure is used by relying, for example, on the nature, size, concentration and spatial location of the metal fibers (three-dimensional distribution). Said metal fiber signature may be measured, for example, by an appropriate sensing system in response to a magnetic stimulus.

Moreover, when a paper sheet is formed, the fibers assume an orientation and a distribution, on which the look-through and other optical properties of the sheet depend. The manufacturer will generally attempt to make the fiber distribution homogeneous in order to create a so-called well-closed formation. The presence of air bubbles is generally considered to be a defect, as these air bubbles lead to surface irregularities when forming the sheet, and/or to the presence of minute holes in the sheet. These defects are conspicuous by transmission or look-through, as they generate a locally smaller material density.

The manufacturer may also have to deposit on the paper sheet surface one or more non-fibrous, notably binder-based, surface layers, so as to provide printability characteristics and/or specific properties. Here again, air bubbles within these layers cause defects known as "pinholes" leading to visible light-colored spots, notably in transmitted light.

Devices for removing the air bubbles before they reach the area where the paper layer is formed have been developed. In particular, paper machines are equipped with circuits for stock deaeration so as to reduce the air bubbles.

SUMMARY OF THE DISCLOSURE

Similarly, air bubble creation is avoided in surface layers by introducing adequate surfactants such as anti-foaming agents.

An aim of the present invention, according to one aspect, is to provide a structure comprising:
  at least one fibrous material substrate,
  optionally, at least one surface layer, in particular based on a binder, deposited on one face of the substrate,
  a plurality of heterogeneous elements of the substrate and/or the optional surface layer dispersed, in particular randomly, within the substrate and/or the optional surface layer,
  at least one authenticating and/or identifying piece of information having a relationship with at least one spatial and/or physical feature of at least part of said heterogeneous elements.

In particular, the heterogeneous elements according to the invention are different from heterogeneous elements obtained for example by using one or more different solid material(s). For example, this or these material(s) is or are fibers, particles or flakes.

The heterogeneous elements may optionally be a watermark.

To form the heterogeneous elements it is possible, for example, to inject air at a certain frequency within the fibrous material substrate or surface layer along the width of the paper machine, in order to create bubbles. This "pulsed" injection thus generates fields of heterogeneous elements, these fields being spaced from one another with a given, non-random step. However, within the fields, the distribution of heterogeneous elements is random.

By means of this invention, at least some of the heterogeneous elements in the fibrous material substrate and/or the surface layer may be used in order to form a signature, in particular a three-dimensional signature, associated with the structure.

The signature of the structure, which is related to the position, frequency, density of the heterogeneous elements and, possibly, the shape and nature of the heterogeneous elements, is then unique in a given inspection area of the structure.

The authenticating and/or identifying information may possibly serve to establish a one-to-one or bi-jective relationship between the structure and the data on the structure.

The heterogeneous elements may serve as a first-level authentication (as seen by the naked eye), and the three-dimensional signature related to the spatial and/or physical features, may constitute a third-level identifying element (detectable by means of an appropriate sensor).

The presence of the heterogeneous elements may serve to prevent tampering. For example, mechanical scraping of printed indicia may lead to a change in the spatial and/or physical features in the scraped area.

Thus, this invention improves the protection of the structure against tampering and/or counterfeiting attempts.

Preferably, the heterogeneous elements are generated during the formation of the fibrous material substrate formation in the wet phase and correspond to fluctuations in the substrate mass density. These mass density fluctuations may be caused, in particular, by gas injection during the wet phase when forming the substrate, and cause fluctuations in the optical properties of the substrate.

The heterogeneous elements may have, for example, a mass density smaller than that of the remainder of the substrate and form light-colored spots that are visually perceptible in transmitted light.

The heterogeneous elements may, if desired, be invisible to the naked eye and be detectable only by means of an appropriate sensor such as a microscope.

The heterogeneous elements may optionally be dispersed, in a privileged manner, in a defined area of the substrate, in particular in an area bounded by a watermark such as by injecting one or more gases through small apertures, for example, formed on punches used to form the watermark, and attached to the rotary wire cylinder of the paper machine.

When the structure comprises a surface layer, the heterogeneous elements within this layer are notably generated when applying the surface layer to the previously formed substrate, wherein the heterogeneous elements correspond to fluctuations in the mass density of the surface layer. These mass density fluctuations may be caused, for example, by the release of the gas or gases that were trapped within the substrate during the drying phase, the gas or gases released by the substrate penetrating the surface layer, or also by intentionally injecting gas into the still wet surface before or during its application to the substrate. These heterogeneous elements within the surface layer generate fluctuations in its optical characteristics.

The surface layer may notably be made of a binder and is advantageously arranged so as to provide the structure with specific printability characteristics and/or properties such as a variable optical effect.

The surface layer may be other than a varnish. In particular, the surface layer may be a composition comprising coating or surface pigments and at least one binder. Pigments which can be used include natural or synthetic mineral pigments such as kaolin and/or calcium carbonate and/or silica, optionally in pyrogenic form, and/or an optionally pyrogenic titanium dioxide, as well as iridescent pigments, for instance of the mica-titanium type, as well as plastic pigments, such as hollow plastic microspheres made of a styrene polymer, such as acrylic-styrene, notably with a mean microsphere diameter of 0.5 mm to 1.0 mm.

This layer comprises at least one binder, such as a starch, or synthetic binders conventionally used in paper making, such as, optionally, any additive conventionally used by those skilled in the art, having a function to improve the rheological properties of the coating slip and to provide the layer with particular properties. The layer weight is of 2 to 50 $g/m^2$ on one or each face, that is including a surface coating with a layer weight of 2 to 10 $g/m^2$.

In a particular embodiment, the pigmented layer contains 70 to 95% pigments and 5 to 30% binders, exclusive of additives.

According to a particular embodiment, the surface layer is at least translucent and comprises 30 to 50% by dry weight of pyrogenic silica and 50 to 70 parts by dry weight of an elastomeric binder such as polyurethane, wherein the sum of the parts of said constituents is 100 in total, the weight of the deposited layer is 1 to 15 $g/m^2$ per face in a dry state, preferably 1 to 10 $g/m^2$ per face, and more preferably, 2 to 7 $g/m^2$ per face in a dry state. The layer may comprise other dispersing additives, such as, for example, viscosity modifiers, plasticizers, bacteriostatic agents, or fungicides. It may also include other authenticating agents or tamper-proofing agents.

Such a layer is described in patent application WO 02/20902.

The gas or gases used may be chosen so as to interact with one or more reactive areas in the substrate and/or in the optional surface layer so as to induce an optical and/or physical change in the heterogeneous elements. This change may correspond, for example, to the formation of a colored spot in one heterogeneous element.

At least one of the heterogeneous elements, and, more particularly most of them, each have a surface area of less than 10 $mm^2$, for example of 0.01 $mm^2$ to 10 $mm^2$, and, more particularly of 0.2 $mm^2$ to 5 $mm^2$. The heterogeneous elements may have, at least for one predefined area in the structure, a density of 1 to 100 heterogeneous elements per $cm^2$, and, more particularly of 5 to 50 per $cm^2$, for example 10 to 20 per $cm^2$.

In an exemplary embodiment of the invention, the structure comprises security elements different from the heterogeneous elements, arranged so as to define another signature of the structure, which is different from the signature related to the heterogeneous elements.

These security elements comprise, for example, particles, fibers such as magnetic fibers, or flakes, and are randomly dispersed, notably in at least one zone of the structure.

Identification of the structure may thus be performed using at least two distinct signatures.

In an exemplary embodiment of the invention, the structure comprises at least one security element, notably a plurality of security elements, for example comprising fibers such as magnetic fibers, this or these security element(s) being arranged so as to create a previous security feature making it possible to access the verification of the signature related to the heterogeneous elements. Thus, a structure may be made with cascaded security features.

The spatial and/or physical feature(s) related to the heterogeneous elements is or are measured, notably in a predefined area of the structure, by means appropriate sensors, and the measurements advantageously allow a three-dimensional signature of the structure to be defined in said area. Alternatively, this signature may be stored within the structure or separately therefrom.

In an exemplary embodiment of the invention, the authenticating and/or identifying information contains the spatial and/or physical feature(s) related to the heterogeneous elements. The information may be stored in the structure and, as a consequence, it is not necessary to recover the information stored separately from the structure, notably during the authenticating and/or identifying process.

Alternatively, the authenticating/identifying information does not contain the spatial and/or physical feature(s) but comprises, notably, an identifier, this identifier being stored on the structure. This identifier enables the recovery of the spatial and/or physical features related to the heterogeneous elements stored on an information medium separate from the structure. This exemplary embodiment of the invention offers the advantage of requiring less memory space on the structure.

The spatial and/or physical features may be stored, for example, in the database of a system for on-demand delivery, based on the identifier, of data to a terminal such as a cellular phone or a computer, in particular via a computer network such as the internet. The spatial and/or physical features may optionally be associated with other database information.

The identifier enabling recovery of the spatial and/or physical features may, for example, comprise at least one piece of information usually present on the structure, such as, for example, an individuals personal information (surname, given name, . . . ) of an identity document, or a bank note serial number.

The identifier may or may not be perceptible. For example, it may be stored as an alphanumeric series, whether encrypted or not, a barcode, optionally, a two-dimensional barcode, which may be printed on the structure, a magnetic tape, an electronic device comprising, in particular, an electronic chip, or an optical memory.

A spatial feature may pertain to the position, orientation, frequency, shape, size or density per unit surface of a plurality of heterogeneous elements. A physical feature may correspond to the nature of the heterogeneous elements, such as an optical (e.g. brightness), electrical, electromagnetic, thermal, or acoustical feature related to a plurality of heterogeneous elements.

The authenticating and/or identifying information may contain, if desired, or alternatively, be used for recovering such information as an image of at least part of the heterogeneous elements in the structure. For example, the image may be a digital image.

The identification of a signature may be related to optical characteristics. Alternatively, the identification may be of a thermal or electrical type, or based on mass density variations generated by the heterogeneous elements.

Authenticating and/or identifying the structure may include the step of comparing said image, whether automatically or not, with the heterogeneous elements within the structure, in particular with the naked eye, or by means of an appropriate device such as a camera.

For example, the spatial and/or physical features may correspond to the mean optical density of a plurality of heterogeneous elements.

When the authenticating and/or identifying information contains the spatial and/or physical features, this information is preferably not directly perceptible, and, more particularly, the information may be encrypted and/or stored in a form allowing it to be read by means of an appropriate reading device.

Preferably, the structure comprises at least one perceptible indicium.

By "perceptible indicia", it is notably meant information such as a text, image or logo, visible on the structure.

For example, the perceptible indicia comprise at least one element of an individuals personal information, such as the surname, given name and nationality and/or a biometric parameter such as the height, weight and hair or eye color.

The perceptible indicia may possibly comprise an image, such as an identity photograph.

When the structure is an integral part of a document of value such as a banknote, the perceptible indicia may, for example, comprise a serial number.

The perceptible indicia may, in particular, be printed.

Advantageously, the structure comprises at least one information medium, which may contain the authenticating and/or identifying information and also, optionally in combination, at least one piece of information indicative of at least one perceptible indicium on the structure.

For example, the information medium may comprise at least one barcode, optionally of the two-dimensional type, a magnetic strip, and an electronic device such as an electronic chip, or an optical memory without any limitation thereto.

The barcode may notably be printed.

Preferably, the authenticating and/or identifying information and the information indicative of at least one perceptible indicium are not directly perceptible.

Therefore, it is possible to establish a one-to-one relationship between the structure and one or more perceptible indicia on the structure.

When the authenticating and/or identifying information does not directly contain the spatial and/or physical feature, the latter being contained in an information medium separate from the structure, the information indicative of the perceptible indicia is also preferably contained in the information medium separate from the structure.

Thus, both the authenticating and/or identifying information and the information indicative of the perceptible indicia may be recovered from the information medium.

Authenticating and/or identifying the structure may comprise, on the one hand, checking whether heterogeneous elements of the structure match with the spatial and/or physical feature derived from the authenticating and/or identifying information and, on the other hand, checking whether one or more perceptible indicia of the structure match with the information indicative of said one or more perceptible indicia.

In an exemplary embodiment of the invention, the heterogeneous elements are dispersed in a substantially uniform manner throughout the surface of the fibrous layer.

Alternatively, the structure comprises one or more fields or heterogeneous elements, which may for example have different spatial and/or physical features. For example, there may be one field wherein the density (number of heterogeneous elements per unit surface) is greater, for example at least twice as great, or even at least five times as great, as those of areas of the fibrous layer which lie outside said field.

The structure may comprise at least one locating system arranged for locating, among all the heterogeneous elements, a subset of heterogeneous elements used for deriving the predetermined spatial and/or physical feature.

For example, this locating system may comprise a plurality of guide marks for delimiting an inspection area containing the subset of heterogeneous elements, wherein these markers may or may not be perceptible in visible light.

At least one of these guide marks may comprise, for example, a mark whose shape, size and/or color may be chosen so as to improve the esthetic value of the structure.

For example, the locating system may comprise at least three non-aligned marks.

For example, at least one of the marks may have a substantially circular, rectangular, triangular or star shape, without any limitation thereto.

In an exemplary embodiment of the invention, at least one of these marks is printed.

The mark(s) may be constituted by the elements usually found on the structure.

Thus, when the structure comprises an image, the mark(s) may be constituted, for example, by image elements.

The inspection area containing the subset of heterogeneous elements delimited by the locating system may, for example, have a substantially circular, rectangular or triangular shape, without any limitation thereto.

Alternatively, the spatial and/or physical feature is derived from all heterogeneous elements in the structure, and the borders of the document can then delimit the inspection area.

In an exemplary embodiment of the invention, the substrate is a paper layer.

Another aim of the invention is, according to another aspect, to provide a document, notably, a security and/or value document, incorporating a structure such as defined above. For example, the document may be one of the following: a banknote, a security paper, an identity document, a passport slip or cover, a visa, a coupon, a document of value other than a banknote, such as a check or a credit card, a protecting and/or authenticating label, a traceability label.

Another aim of this invention, according to another aspect, is to provide a packaging device, such as a packing, incorporating a structure such as defined above.

In particular, the packaging device may be used for packaging one or more pharmaceutical compositions, and may comprise, for example, a blister.

Another aim of this invention, according to another aspect, is to provide a sheet material comprising:
  at least one fibrous material substrate,
  optionally, at least one surface layer, notably based on a binder, deposited on one face of the substrate,
  a plurality of heterogeneous elements of the substrate and/or the optional surface layer, which are dispersed, in particular randomly, within the substrate and/or the optional surface layer.

By "sheet material", is meant a paper sheet having a single layer or multilayer structure. A sheet material may, for example, have a relatively small thickness, in particular, of 3 mm or less, for example, of about 100 µm, and may be flexible. In an exemplary embodiment of the invention, the sheet material may notably be packaged as a reel allowing it to be cut to the desired format.

Another aim of this invention, according to another aspect, is to provide a method for manufacturing a structure comprising a fibrous material substrate, wherein the method comprises the steps of:

forming the substrate in contact with a forming surface, for example a surface immersed within a fibrous material suspension, allowing gas bubbles, in particular air bubbles to form in the fibrous material suspension so that heterogeneous elements are formed within the substrate, the bubbles originating, for example, from the delivery of a gas within the fibrous material suspension.

By monitoring the formation of bubbles in the fibrous material suspension, it is possible to obtain a substrate having heterogeneous elements with the desired density and/or mean size.

Another aim of this invention, according to another aspect, is to provide a method for manufacturing a structure comprising a fibrous material substrate and a surface layer, for example based on a binder, wherein the method comprises the following steps:

forming the substrate in contact with a forming surface, for example a surface immersed within a fibrous material suspension, depositing the surface layer, in particular by surface application, on one face of the substrate by allowing gas bubbles, in particular air bubbles to form in the surface layer so that heterogeneous elements are formed within the surface layer, the bubbles originating, for example, from the delivery of a gas within a batch of a material intended to form the surface layer.

By monitoring the formation of bubbles, it is possible to obtain a surface layer having heterogeneous elements with the desired density and/or mean size.

Another aim of this invention, according to another aspect, is to provide a method for manufacturing a structure comprising a fibrous material substrate and a surface layer, for example based on a binder, wherein the method comprises the following steps:

forming the substrate in contact with a forming surface, for example a surface immersed within a fibrous material suspension, wherein the substrate notably has a high porosity and contains a trapped gas such as air, depositing the surface layer, in particular by surface application, by allowing gas bubbles, in particular air bubbles, to form in the surface layer, by promoting degassing of the substrate into the surface layer, in particular during the drying of the surface layer, so that heterogeneous elements are formed therein.

In the above-described manufacturing methods, the bubbles may be formed by injecting one or more gases and the size and/or shape of the heterogeneous elements may be controlled, in particular by selecting the nature of the employed gas or gases, their flow rate and/or the injection mode.

For example, it is possible to employ different gases in order to form heterogeneous elements having various sizes and/or shapes.

Preferably, the following steps are carried out:

optionally, delimiting an inspection area by means of at least one guide mark, which guide mark may or may not be inherent to the substrate or the surface layer, retrieving at least one spatial and/or physical feature from at least part of the heterogeneous elements, in particular those that are dispersed within the optional inspection area, providing the structure with at least one authenticating and/or identifying piece of information having a relationship with said at least one spatial and/or physical feature.

The retrieval of said spatial and/or physical feature may be performed by at least one of the following methods or a combination of at least two of the following methods: image analysis, whether or not in visible light, for example in infrared or ultraviolet light, and particularly by detecting the differences in look-through brightness or by detecting the optical or absorption density of a wave, whether visible or not, capacitive analysis, ultrasound analysis, thermal excitation analysis, heat capacity analysis, without any limitation thereto.

The methods for retrieving and processing the spatial and/or physical features of heterogeneous elements within an inspection area may be based upon:

an optical detection carried out with one or more sensors, followed by an analysis of the received signal. This optical detection may be based, in particular, on the brightness difference in visible light of the heterogeneous elements, detectable by look-through using a CCD or CMOS camera, a detection of the response generated by the heterogeneous elements within the inspection area under or following thermal, electrical, electromagnetic or acoustical stimulus.

In particular, this detection may be based on:

the specific absorption of a visible or non-visible wave, a specific capacitance, a specific thermal absorption, a specific transmission of IR radiation, an acoustical modification, related to the heterogeneous elements within the inspection area.

One of the heterogeneous elements may not be visible to the naked eye (for example, if this heterogeneous element is defined by a cavity created within the paper substrate by means of a laser).

The identification may be carried out by means of several sensors and by moving the latter relative to the substrate during the identifying process so as to scan the inspection area.

Preferably, the following steps are carried out:

providing the structure with at least one perceptible indicium, and either recording said authenticating and/or identifying information and a piece of information indicative of said perceptible indicia on the structure in a non-directly perceptible manner, for example through encryption, optionally in an electronic memory or on a magnetic medium, either recording, on an information medium separate from the structure, said at least one spatial and/or physical feature and a piece of information indicative of said perceptible indicia.

Another aim of this invention, according to another aspect, is to provide a method for authenticating and/or identifying a structure, wherein the structure comprises:

a fibrous material substrate, optionally, a surface layer deposited on one face of the substrate, a plurality of heterogeneous elements of the substrate and/or the optional surface layer, which are dispersed, in particular randomly, within the substrate and/or the optional surface layer, at least one authenticating and/or identifying information having a relationship with at least one spatial and/or physical feature of at least one portion of said heterogeneous elements, wherein the method comprises the steps of:

reading the authenticating and/or identifying information, comparing said at least one spatial and/or physical feature having a relationship with the authenticating and/or identifying information, with at least one spatial and/or physical feature derived from said structure, drawing a conclusion as to the authenticity and/or identity of the structure based at least on the comparison.

Preferably, the structure comprises at least one perceptible indicium.

In an exemplary embodiment of the invention, a piece of information indicative of the perceptible indicia as well as the authenticating and/or identifying information are recorded in the structure itself, preferably in a non-directly perceptible manner, particularly through encryption, for example, by being stored in an electronic chip or an optical memory.

Alternatively, this information is recorded on an information medium which is separate from the structure, for example, an electronic memory, a magnetic tape or disk, or an optical disk.

Preferably, the method comprises the steps of:

comparing a piece of information indicative of the perceptible indicia with the perceptible indicium itself on the structure, drawing a conclusion as to the authenticity and/or identity of the structure based at least on said comparison.

BRIEF DESCRIPTION OF THE DRAWINGS

The present invention will become apparent from the following detailed description by way of non-limiting example of the invention, and by referring to the accompanying drawings, wherein:

FIGS. 1 and 2 schematically and partially show a barcode which can be used in a structure according to this invention;

FIG. 3 is a schematic and partial view of a barcode which can be used in a structure according to this invention;

FIG. 4 is a schematic and partial view of a step for manufacturing a fibrous layer of a structure according to the invention;

FIG. 9 is a schematic and partial view of a rotary wire cylinder according to an exemplary embodiment of the invention;

FIG. 10 schematically and partially illustrates a step for recovering information for authenticating and/or identifying a structure according to the invention; and FIGS. 11 and 12 are two block diagrams showing the different steps of the two authenticating and/or identifying methods according to the invention, respectively.

MORE DETAILED DESCRIPTION

Figure 5:
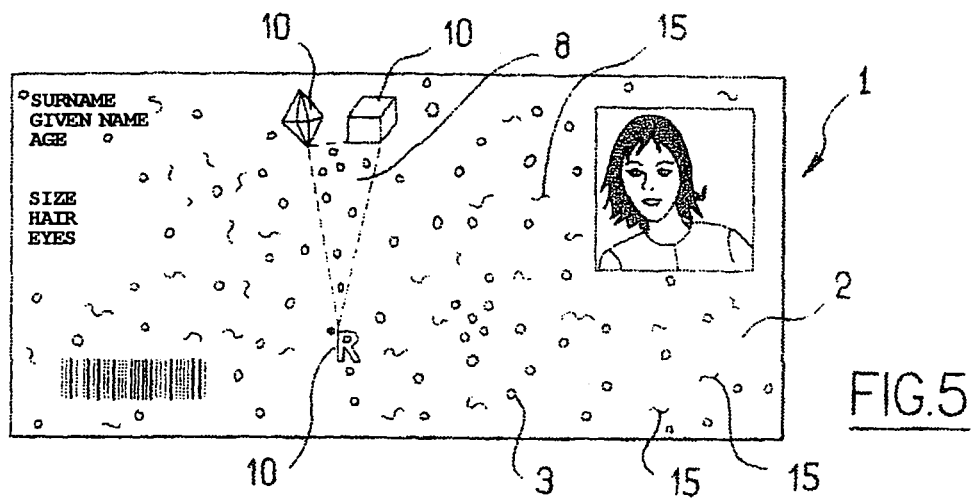
FIGS. 5 to 7 are schematic and partial views of structures according to three other exemplary embodiments of the invention.
Figure 6:
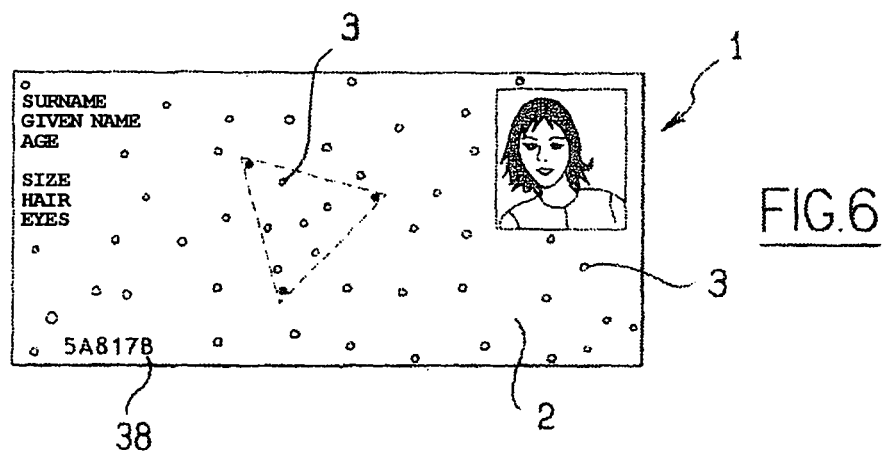

A structure 1 comprising a substrate 2 according to the invention is shown in FIG. 1.

In the considered example, substrate 2 is a fibrous layer formed by means of a round-shaped paper machine 20, as shown in FIG. 4. Alternatively, substrate 2 could be formed differently, in contact with a forming surface defined by a conveyor wire, which may for example be immersed.

Machine 20 comprises a tank 21 containing a suspension 23 of fibers, for example cellulose fibers and/or cotton linters, and/or synthetic and/or artificial fibers, in which is partially immersed a rotary wire cylinder 22 defining a surface 24, in contact with which the fibrous layer 2 is formed continuously.

A duct 25 is provided for supplying air within the fiber suspension 23 in order to form air bubbles 26. The air supply may be provided in a portion of the suspension 23 where a cylinder 22 is immersed, before the fibrous layer is formed, or in the portion of suspension 23 where cylinder 22 protrudes (see FIG. 4).

These bubbles generate heterogeneous elements 3 within fibrous layer 2, as shown quite schematically in FIG. 1.

Of course, heterogeneous elements 3 could be formed by any other appropriate means, notably according to the manufacturing method of substrate 2.

Substrate 2 may be made, for example, on a Fourdrinier paper machine.

In an exemplary embodiment of the present invention, substrate 2 comprises two plies of paper, the heterogeneous elements 3 being made between the still wet plies of paper by means of a spray.

In another exemplary embodiment of the invention, it is possible to insert an element such as a security wire or tape within the substrate, which is capable of releasing a gas, in particular when the substrate passes through a drying unit of the paper making machine in order to create the heterogeneous elements.

In the considered example, substrate 2 is based on paper making fibers. Alternatively, substrate 2 may comprise fibers of a different kind, for example metal and/or magnetic fibers.

When substrate 2 comprises a mixture, for example, of paper making fibers and magnetic fibers, heterogeneous elements 3 according to the invention are not made of the magnetic fibers.

Each heterogeneous element 3 corresponds to a light-colored spot conspicuous by transparency in transmitted light, having a mass density smaller than that of the remainder of substrate 2.

The position, orientation, frequency, density and/or shape of heterogeneous elements 3 may be controlled by choosing the air injection system and/or by setting, for example, the leaking air flow within fiber suspension 23.

Heterogeneous elements 3 may have a mean size of, for example, 0.01 $mm^2$ to 10 $mm^2$, and particularly 0.2 $mm^2$ to 5 $mm^2$.

Heterogeneous elements 3 may have, at least in one predefined area, a density of 1 to 100 heterogeneous elements per $mm^2$, preferably 5 to 50, for example, 10 to 20 per $cm^2$.

Heterogeneous elements 3 may be distributed within substrate 2 in a substantially uniform way, as shown in FIG. 1.

Alternatively, as shown in FIG. 2, heterogeneous elements 3 form, within substrate 2, one or more fields 5 whose density (i.e. the number of heterogeneous elements per unit surface) is at least, for example, twice as great, or even at least five times as great, as that of the areas outside field(s) 5.

Optionally, the gas or gases employed to form heterogeneous elements 3 may be chosen so as to interact with one or more reactive areas of substrate 2 in order to create an optical and/or physical modification in the heterogeneous elements 3.

For example, as shown in FIG. 2, some heterogeneous elements 3 may appear with a first color and others, with a second color, different from the first one.

Figure 7:
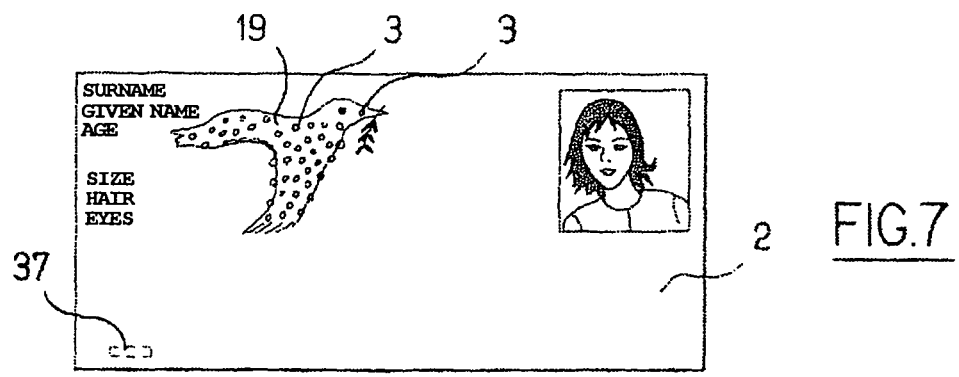

As shown in FIG. 7, heterogeneous elements 3 may be dispersed in a privileged manner within an area defined by a watermark 19.

Said heterogeneous elements 3 may be formed, in particular, by injecting one or more gases through small apertures 28 which are formed on punches 29 used to form the watermark 19, and attached to the rotary wire cylinder 22 of the paper machine, as shown in FIG. 9.

Due to their random distribution within substrate 2 or within several fields thereof, heterogeneous elements 3 form a unique signature associated with substrate 2.

After the substrate has been manufactured, at least one spatial and/or physical feature indicative of at least part of heterogeneous elements 3 is retrieved.

In an exemplary embodiment of the invention, this feature is determined by taking into account all heterogeneous elements 3 of substrate 2.

Alternatively, this feature is determined for a subset of heterogeneous elements 3.

When substrate 2 has one or more fields of heterogeneous elements 5, as shown in FIGS. 2 and 7, the spatial and/or physical feature is determined, for example, for at least one of these fields 5.

In particular, when heterogeneous elements 3 are distributed in a substantially uniform manner within substrate 2, as shown in FIG. 1, structure 1 may comprise a locating system 7 for locating, among all of the heterogeneous elements 3, a subset 8 of heterogeneous elements 3 used for deriving the spatial and/or physical feature.

The locating system 7 may comprise a plurality of guide marks 9 each made, in the described example, of a mark on one face of substrate 2.

Guide marks 9 may be made in various ways.

For example, at least one of guide marks 9 is printed on substrate 2.

Alternatively, at least one of guide marks 9 may be made of an element pasted on substrate 2.

The shape, dimensions and/or color of guide marks 9 may be chosen so as to contribute to the esthetic value of structure 1.

In the considered example, each guide mark 9 is a circular dot.

Alternatively, guide marks 9 may have a rectangular, triangular or star shape, or the like.

It is also possible, in order to locate subsets 8 of heterogeneous elements 3, to make use of elements 10 such as texts, symbols or drawings, that are usually pre-sent on structure 1, as shown in FIG. 5.

Thus, it is possible to avoid the requirement of providing specific guide marks on structure 1.

In the described examples guide marks 9 are three in number and are not aligned.

Locating system 7 may define an inspection area containing subset 8 of heterogeneous elements 3, which has a triangular shape, as shown in FIGS. 1 and 5.

Alternatively, locating system 7 may define an inspection area containing subset 8, which has a different shape, for example a rectangular or circular shape. The retrieval of a spatial and/or physical feature in this inspection area can be carried out according to one or more of the following methods or a combination of at least two of the following methods: image analysis, whether or not in visible light, for example in infrared or ultraviolet light, and more particularly by detecting look-through brightness differences or by detecting the optical or absorption density of a wave, whether visible or not, capacitive analysis, ultrasound analysis, thermal excitation analysis, heat capacity analysis, without any limitation thereto.

For example, a capacitive analysis may be carried out by means of capacitive sensors, optionally arranged as a matrix.

The spatial and/or physical feature may optionally be determined by analyzing a signal under or following thermal, electrical, electromagnetic or acoustical stimulus.

The optical analysis may be carried out by analyzing the show-through image using a CCD or CMOS camera.

The acoustical analysis may be carried out, for example, by analyzing the acoustical attenuation related to the heterogeneous elements when an ultrasound wave irradiates the inspection area.

The spatial and/or physical feature may depend on the position, size or density per unit surface of a plurality of heterogeneous elements or correspond to an optical, electrical, electromagnetic, thermal or acoustical feature related to a plurality of heterogeneous elements.

For example, the spatial and/or physical feature is an optical image of a field 5 of heterogeneous elements.

Structure 1 may comprise perceptible indicia 30.

In the considered example, structure 1 forms an identity document and perceptible indicia 30 comprise elements of an individual's personal information (surname, given name, nationality, or the like) and biometric elements concerning him/her (height, weight, hair and eye color, or the like).

In the considered example, perceptible indicia 30 are printed on substrate 2.

The perceptible indicia may include, for example, an image 31 of an individuals portrait photograph.

Image 31 may be printed on substrate 2 or, alternatively, be constituted by a photograph attached thereto.

When the structure 1 is incorporated into a document of value such as a banknote, a perceptible indicium may be constituted, for example, by a banknote serial number.

A perceptible indicium may also be constituted, for example, by a product trademark.

Structure 1 may comprise an information medium 35 storing in an encrypted form a piece of authentication and/or identification information, which contains the spatial and/or physical feature of part of heterogeneous elements 3, and at least one piece of information indicative of at least one perceptible indicium 30, 31.

The information medium 35 may comprise, for example, a barcode 36 which, in particular, may be printed on substrate 2, as shown in FIG. 1.

The barcode 36 shown in the example of FIG. 1, is of the one-directional type.

Alternatively, information medium 35 may comprise a two-dimensional barcode 36', for example, known as PDF 417, as shown in FIG. 3, for storing a relatively large amount of information.

Of course, information medium 35 may be an element other than a barcode.

As shown in FIG. 2, information medium 35 includes an electronic device 37, comprising, for example, an electronic chip capable of storing data in an encrypted form. This electronic device 37 may, for example, be embedded within substrate 2.

The electronic device 37 may possibly be arranged so as to store information pertaining for example to a person, and to perform an on-demand checking operation of the spatial and/or physical features of the heterogeneous elements within the inspection zone, which checking operation serves as a key in the authentication of the electronic device before exchanging any information. This type of device is described by way of example in patent application WO 2004/012 228.

Alternatively, the information medium 35 may comprise a magnetic strip.

The information medium 35, for instance the barcode 36', may be arranged to store an image of at least part of heterogeneous elements 3, which image contains the spatial and/or physical feature.

The authentication and/or identification of structure 1 may be carried out as follows.

First, the information stored on the information medium 35 is read and decrypted (i.e., step 50 of FIG. 12).

The reading and decryption of the information may be carried out by means of an appropriate reading device, for example, an optical type.

The spatial and/or physical feature read from information medium 35 is compared, whether automatically or not, with a spatial and/or physical feature of substrate 2.

When the information medium 35 stores an image assumed to represent at least one area of substrate 2, the above-mentioned comparison is carried out, for example, between this image and substrate 2 as seen, for example by transparency in transmitted light.

The information indicative of the perceptible indicia is compared with the perceptible indicia on structure 1 (i.e., step 51 of FIG. 12).

With the above-mentioned comparisons the one-to-one relationship between the perceptible indicia on structure 1 and substrate 2, and therefore, the authenticity of perceptible indicia on substrate 2 may be verified (i.e., step 52 of FIG. 12).

In another exemplary embodiment of the invention, the information indicative of the spatial and/or physical feature and at least one perceptible indicium are not stored on structure 1 itself, but are stored on an information medium 40 separate from structure 1, as illustrated in FIG. 10.

This information medium 40 may be constituted, for example, by the database of a computer system.

In the considered example, as shown in FIG. 10, structure 1 comprises a piece of authenticating and/or identifying information 38 such as an identifier, for recovering information associated with structure 1 and stored on the information medium by means of a terminal 41 such as a cellular phone.

Identifier 38 may comprise, for example, a series of alphanumeric characters and may be visually perceptible on one face of structure 1.

For example, identifier 38 may be printed on structure 1.

Alternatively, identifier 38 may be stored, for example, on the information medium, such as a barcode or an electronic device.

Terminal 41 may be coupled to the database 40 via a wire or wireless link.

Structure 1 may contain no identifier 38, in which case the information usually found on structure 1, such as elements of an individuals personal information, can be used for recovering information useful for the authentication and/or identification.

The authentication and/or identification may be carried out as follows.

Identifier 38 is read (i.e., step 55 of FIG. 11) and information useful for the authentication and/or identification of structure 1, namely information indicative of a spatial and/or physical feature of a plurality of heterogeneous elements of at least one perceptible indicium is recovered (i.e., step 56 of FIG. 11).

For recovering information useful for the authentication, a user may transmit the identifier 38 by means of terminal 41 to the system comprising the database 40 which, in return, sends the above-mentioned information including, for example, an image 42 of a field of heterogeneous elements to terminal 41.

The recovered information is compared to the information on structure 1 (i.e., step 57 of FIG. 11), so that a conclusion can be drawn as to the authenticity of structure 1 (i.e., step 58).

In the above described examples, structure 1 forms an identity document such as an identity card.

Alternatively, the document may be selected among the following elements: a banknote, a security paper, a passport slip or cover, a visa, a coupon, a document of value other than a banknote, such as a check or credit card, a protecting and/or authenticating label, or a traceability label.

Structure 1 may comprise at least one of the following security elements: tamper-revealing element, which, in particular may be visible and/or detectable by means of a specific detection device, an element producing a variable and/or diffractive, interferential, iridescent effect or of the liquid crystal type, a magnetic or crystal coating, magnetic fibers, tracers detectable by magnetic resonance, tracers detectable by X-ray fluorescence, UV-detectable fibers, elements detectable by microwave radiation, biomarkers, in particular DNA markers, a varnish or ink, optical filters, light-emitting or fluorescent tracers, photochromic, thermochromic, light-emitting and/or piezochromic compounds and/or compounds changing in color when brought in contact with one or more predetermined substances.

If desirable, structure 1 may comprise security elements 15 arranged so as to define a signature of the structure, which is different from the signature related to heterogeneous elements 3.

These security elements 15 comprise, for example, fibers such as magnetic fibers randomly dispersed within structure 1, as shown in FIG. 5.

The identification of the structure may thus be performed on the basis of at least two distinct signatures.

It is possible to combine two signatures so as to define a single signature.

Of course, the invention is not restricted to the above-described exemplary embodiments.

Figure 8:
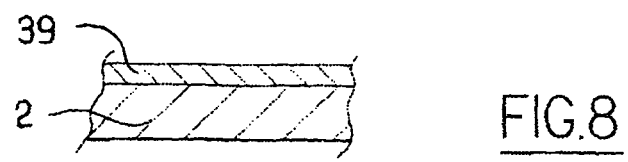
FIG. 8 is a schematic cross-sectional view of a structure according to an exemplary embodiment of the invention, comprising a surface layer.

As shown in FIG. 8, heterogeneous elements 3 may be generated within a surface layer 39 when applying the surface layer on the previously formed substrate, the heterogeneous elements corresponding to mass density fluctuations of layer 39. These mass density fluctuations may be caused, for example, by a release of the gases trapped within substrate 2 during the drying phase, whereby the gases released by the substrate penetrate the surface layer or, alternatively, by intentional injection of gases within the still wet surface layer 39, before or when it is applied to the substrate. These heterogeneous elements of surface layer 39 generate optical density fluctuations.

Surface layer 39 may comprise a binder, for example, a polymer or copolymer based binder, for example a styrene-butadiene polymer, for providing structure 1 with specific printability characteristics and/or properties such as a variable optical effect.

The above-described examples referring to the heterogeneous elements 3 within substrate 2 are obviously also applicable to the case of heterogeneous elements within surface layer 39.

The structure may optionally comprise heterogeneous elements both within the substrate and the surface layer.

The invention claimed is:
1. A structure comprising:
a fibrous material substrate,
a plurality of heterogeneous elements associated with the fibrous material substrate and having random dispersion with regard to the fibrous material substrate, wherein the plurality of heterogeneous elements have, at least in a predefined zone of the structure, a density of from 1 to 100 heterogeneous elements per cm$^2$ and a first information having a relationship with at least one spatial characteristic and/or physical feature of at least a portion of the plurality of heterogeneous elements, wherein the first information represents an identifier for recovering the spatial characteristic(s) and/or physical feature(s) stored on a medium.

2. The structure of claim 1, wherein the structure further comprises at least one surface layer that includes the plurality of heterogeneous elements.

3. The structure of claim 2, wherein the surface layer further comprises a coating or surface pigments and at least one binder.

4. The structure of claim 1, wherein the plurality of heterogeneous elements comprise wet-formed elements in a dry state.

5. The structure of claim 1, wherein the plurality of heterogeneous elements correspond to fluctuations in a substrate mass density.

6. The structure of claim 5, wherein the plurality of heterogeneous elements have a mass density smaller than that of a remainder of the fibrous material substrate.

7. The structure of claim 6, wherein the plurality of heterogeneous elements form light-colored spots visually perceptible in transmitted light.

8. The structure of claim 1, wherein the structure further comprises a surface layer comprising the plurality of heterogeneous elements.

9. The structure of claim 8, wherein the plurality of heterogeneous elements correspond to mass density fluctuations.

10. The structure of claim 1, wherein at least one heterogeneous element of the plurality of heterogeneous elements has a surface area of less than 10 mm$^2$.

11. The structure of claim 10, wherein the surface area is from 0.01 mm$^2$ to 10 mm$^2$.

12. The structure of claim 10, wherein the surface area is from 0.2 mm$^2$ to 5 mm$^2$.

13. The structure of claim 1, wherein the density is from 5 to 50 heterogeneous elements per cm$^2$.

14. The structure of claim 1, wherein the density is from 10 to 20 heterogeneous elements per cm$^2$.

15. The structure of claim 1, wherein the first information represents the spatial characteristic(s) and/or physical feature(s).

16. The structure of claim 1, wherein the spatial characteristic(s) and/or physical feature(s) corresponds to an average optical density of the plurality of heterogeneous elements.

17. The structure of claim 1, wherein the first information is not perceptible without the assistance of a detection device.

18. The structure of claim 17, wherein the first information is encrypted.

19. structure of claim 1, wherein the structure further comprises an information medium capable of storing information.

20. The structure of claim 19, wherein the information medium stores a second information indicative of perceptible indicia on the structure and the second information is encrypted.

21. The structure of claim 1, wherein the structure further comprises at least one visually perceptible indicium.

22. The structure of claim 1, wherein the structure further comprises one or more fields of the plurality of heterogeneous elements.

23. The structure of claim 1, wherein the plurality of heterogeneous elements are dispersed in a substantially random manner throughout the surface of the fibrous material substrate.

24. The structure of claim 1, wherein the structure further comprises at least one locating system arranged for locating a subset of the plurality heterogeneous elements.

25. A document comprising a structure according to claim 1.

26. The document of claim 25, wherein the document is a security and/or a value document.

27. A packaging device comprising a structure according to claim 1.

28. A sheet material comprising a structure according to claim 1.

29. A method for manufacturing the structure of claim 1, the method comprising:

forming the substrate in contact with a surface immersed in a fibrous material suspension, allowing bubbles to form within the fibrous material suspension so that the plurality of heterogeneous elements is formed within the substrate, the bubbles originating from the delivery of a gas within the fibrous material suspension.

30. The method of claim 29, the method further comprising:

optionally, delimiting an inspection area by means of at least one guide mark, retrieving at least one spatial and/or physical feature of at least a part of the plurality of heterogeneous elements, providing the structure with at least one piece of authenticating and/or identifying information having a relationship with the spatial and/or physical feature.

31. The method of claim 30, wherein the retrieval of the spatial and/or physical feature is performed by at least one of methods, or a combination of at least two of the methods, selected from the group consisting of image analysis, capacitive analysis, ultrasound analysis, thermal excitation analysis, and heat capacity analysis.

32. A method for manufacturing the structure of claim 1, the method comprising:

forming the substrate in contact with a forming surface, depositing the surface layer on one face of the substrate by allowing bubbles to form within the surface layer so that the plurality of heterogeneous elements are formed within the surface layer, the bubbles originating from the delivery of a gas within a batch of a material intended to form the surface layer.

33. A method for manufacturing the structure of claim 1, the method comprising:

forming the substrate in contact with a forming surface wherein the substrate notably has a high porosity and contains a trapped gas, depositing the surface layer by allowing bubbles to form in the surface layer by promoting the degassing of the substrate into the surface layer.

34. The method of claim 33, wherein the surface layer comprises coating or surface pigments and at least one binder.

35. A structure comprising:

a fibrous material substrate, a plurality of heterogeneous elements associated with the fibrous material substrate and having random dispersion with regard to the fibrous material substrate, wherein the plurality of heterogeneous elements have, at least in a predefined zone of the structure, a density of from 1 to 100 heterogeneous elements per cm$^2$ and a first information having a relationship with at least one spatial characteristic and/or physical feature of at least a portion of the plurality of heterogeneous elements, wherein the first information is encrypted.

36. A structure comprising:

a fibrous material substrate, a plurality of heterogeneous elements associated with the fibrous material substrate and having random dispersion with regard to the fibrous material substrate, wherein the plurality of heterogeneous elements have, at least in a predefined zone of the structure, a density of from 1 to 100 heterogeneous elements per $cm^2$ and a first information having a relationship with at least one spatial characteristic and/or physical feature of at least a portion of the plurality of heterogeneous elements, wherein the structure further comprises an information medium storing the first information electronically or on which the first information is present in printed form.

37. A structure comprising:

a fibrous material substrate, a plurality of heterogeneous elements associated with the fibrous material substrate and having random dispersion with regard to the fibrous material substrate, wherein the plurality of heterogeneous elements have, at least in a predefined zone of the structure, a density of from 1 to 100 heterogeneous elements per $cm^2$ and a first information having a relationship with at least one spatial characteristic and/or physical feature of at least a portion of the plurality of heterogeneous elements, wherein the spatial characteristic(s) and/or physical feature(s) is related to a position, orientation, frequency, shape, size or density per unit surface of the plurality of heterogeneous elements or corresponds to an optical, an electrical, an electromagnetic, a thermal or an acoustical feature related to the plurality of heterogeneous elements.

38. A structure comprising:

a fibrous material substrate, a plurality of heterogeneous elements associated with the fibrous material substrate and having random dispersion with regard to the fibrous material substrate, wherein the plurality of heterogeneous elements have, at least in a predefined zone of the structure, a density of from 1 to 100 heterogeneous elements per $cm^2$ a first information having a relationship with at least one spatial characteristic and/or physical feature of at least a portion of the plurality of heterogeneous elements, and a medium separate from the structure storing the spatial characteristic(s) and/or physical feature(s), wherein the first information represents an identifier for recovering the spatial characteristic(s) and/or physical feature(s) stored on the medium separate from the structure.

39. A structure comprising:

a fibrous material substrate, a plurality of heterogeneous elements associated with the fibrous material substrate and having random dispersion with regard to the fibrous material substrate, wherein the plurality of heterogeneous elements have, at least in a predefined zone of the structure, a density of from 1 to 100 heterogeneous elements per $cm^2$ a first information having a relationship with at least one spatial characteristic and/or physical feature of at least a portion of the plurality of heterogeneous elements, and a medium storing the spatial characteristic(s) and/or physical feature(s), wherein the first information represents an identifier for recovering the spatial characteristic(s) and/or physical feature(s) stored on the medium.

40. A structure comprising:

a fibrous material substrate, a plurality of heterogeneous elements associated with the fibrous material substrate and having random dispersion with regard to the fibrous material substrate, wherein the plurality of heterogeneous elements have, at least in a predefined zone of the structure, a density of from 1 to 100 heterogeneous elements per $cm^2$, and a first information having a relationship with at least one spatial characteristic and/or physical feature of at least a portion of the plurality of heterogeneous elements, wherein the first information represents an image of the plurality of heterogeneous elements or contains recovery information configured to enable recovery of the image of the plurality of heterogeneous elements.

* * * * *